United States Patent [19]

Inoue

[11] Patent Number: 4,626,332
[45] Date of Patent: Dec. 2, 1986

[54] FLUSHING FLUID RECYCLING SYSTEM FOR ELECTROEROSION

[75] Inventor: Kiyoshi Inoue, Tokyo, Japan

[73] Assignee: Inoue-Japax Research, Incorporated, Kanagawa, Japan

[21] Appl. No.: 753,562

[22] Filed: Jul. 10, 1985

[30] Foreign Application Priority Data

Jul. 10, 1984 [JP] Japan ............................ 59-141432

[51] Int. Cl.$^4$ .............................. C25F 7/02; B23H 7/36
[52] U.S. Cl. .............................. 204/237; 204/DIG. 13; 219/69 D
[58] Field of Search ............... 204/237, 224 M, 129.2, 204/DIG. 13; 219/69 D, 69 R

[56] References Cited

U.S. PATENT DOCUMENTS

| 3,385,947 | 5/1968 | Inoue | 204/129.2 X |
| 3,417,006 | 12/1968 | Inoue | 204/129.2 |
| 3,420,759 | 1/1969 | Inoue | 219/69 D |
| 3,928,163 | 12/1975 | Ullmann et al. | 219/69 D X |
| 4,208,256 | 6/1980 | Inoue | 204/129.2 |

Primary Examiner—Donald R. Valentine
Attorney, Agent, or Firm—Finnegan, Henderson, Farabow, Garrett & Dunner

[57] ABSTRACT

A flushing fluid recycling system used with an electroerosion machine which includes a regenerating unit, i.e. an ion-exchange column as deionizer, through which the used liquid medium, e.g. water, collected from an electroerosion zone is passed for regeneration and return to the electroerosion zone. A pump is periodically actuated to intermittently pass the liquid medium through the deionizing column with predetermined on-time and off-time regardless of whether the value of an electrical property, e.g. specific resistance of the fluid, determined by a sensing unit lies above a certain level. However, the ratio of the on-time to the off-time is altered depending on the particular value of the electrical property sensed.

6 Claims, 4 Drawing Figures

FLUSHING FLUID RECYCLING SYSTEM FOR ELECTROEROSION

FIELD OF THE INVENTION

The present invention relates to electroerosion and, more particularly, to an electroerosion machine which comprises an improved fluid regenerating system.

BACKGROUND OF THE INVENTION

In an electroerosion machine, for the sake of economy it is customary that a used machining liquid medium from an electroerosion zone is treated and regenerated for recycling into the electroerosion zone. It is desirable that the recycled liquid medium be not only free from eroded particles and sludges but hold a prescribed electrical property that can be measured in terms of specific resistance or conductance. A particular electrical property of the flushing liquid medium need be substantially maintained during a given electroerosion machining operation to obtain optimum machining results. The flushing liquid is typically an aqueous medium or a liquid hydrocarbon having a predetermined resistivity or conductivity. Thus, a system has been known which includes means that is connected for being selectively brought into operation to regenerate the degraded flushing medium when the conductivity thereof determined by a conductivity tester exceeds a predetermined value (see U.S. Pat. Nos. 3,417,006 and 3,928,163). In that system, the regeneration means is designed to remain connected and active continuously for the liquid medium until its conductivity is indicated to fall below the same or another, lower predetermined value.

It has been found that such a system is inefficient and also does not operate in a manner to minimize deviations from a desired level or range of the conductivity of the renewed fluid serving for electroerosion. Due to an inherent delay in the circulation lines after a sharp change occurs in the electroerosion zone until a command to rectify the fluid conductivity is actually reflected on the renewed fluid delivered into the same zone, there tends to develop excessive variations, both upwards and downwards, of the conductivity of the fluid recycled into the electroerosion zone. As a result, the system would repeat "hunting" making unavoidable unnecessary and even detrimental excessive rises and drops of the conductivity and such changes in an electrical property of the fluid in the electroerosion zone.

OBJECTS OF THE INVENTION

The present invention therefore seeks to provide an electroerosion machine which incorporates a novel concept in the operation of regenerating means in the flushing fluid recycling system as a solution to overcome the problems encountered in the prior art.

SUMMARY OF THE INVENTION

It has been found that the problems of the prior art are resolved in an electroerosion flushing medium recycling system incorporating a means for sensing an electrical property of the fluid medium and a fluid regenerating means by rendering the regenerating means periodically active for the regeneratable fluid regardless of values of the electrical property of the fluid determined by the sensing means, in contrast to the earlier system in which the generating means is controlled to remain active continuously as long as the sensed conductivity lies above a predetermined level and remains inactive continuously as long as the sensed conductivity lies below the same or another, lower predetermined level. Furthermore, in the system of the present invention the ratio of the time duration in which the regenerator means is brought into active state to the time interval in which the regenerator means is brought into inactive system is altered depending on whether the sensed electrical property lies above or below a predetermined level.

BRIEF DESCRIPTION OF THE DRAWING

There and other features of the present invention as well as advantages thereof will become more readily apparent from the following description when taken with reference to the accompanying drawings in which.

SPECIFIC DESCRIPTION

Figure 1:
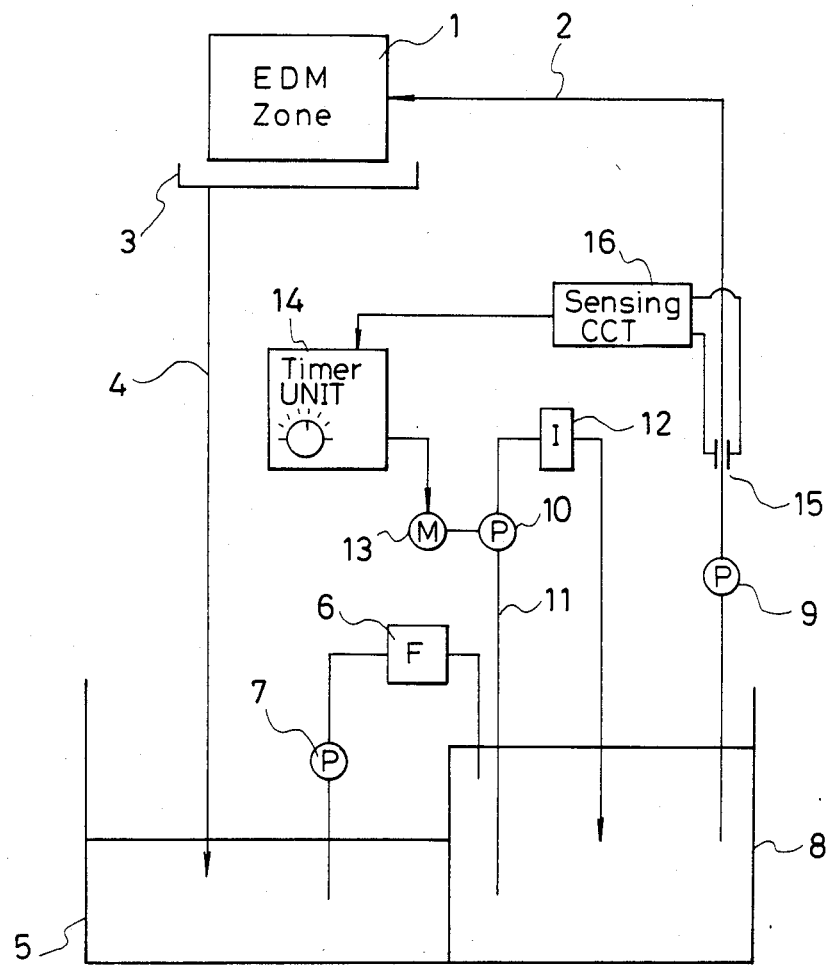
FIG. 1 is a diagrammatic illustration of a flushing fluid circulation system embodying the present invention.

Referring to FIG. 1, an EDM machine embodying the present invention will be described. In the machine an electroerosion zone constituted by a tool electrode, e.g. in the form of a wire or shaped electrode, and a workpiece is generally indicated as EDM (electrical discharge machining) zone at 1. A liquid machining medium, e.g. deionized water, regenerated in the manner to be described, is introduced into the EDM zone 1 through an inlet conduit 2 which may typically end with an orifice disposed adjacent the machining zone 1. A work pan 3 accommodates the EDM zone 1 and collects the liquid medium which has undergone the erosion action and hence has been contaminated with erosion products, and degraded and partially reionized. From the working pan 3, the degraded fluid medium is delivered through an outlet conduit 4 to a dirty-fluid tank 5. The fluid, contaminated by the eroded particles and degraded, is drawn from the tank 5 through a filter 6 by a pump 7 into a clean-fluid tank 8. The filtered fluid, freed from the eroded particles, is drawn from the clean-fluid tank 8 by means of a pump 9 and is delivered via the supply conduit 2 back into the EDM zone 1.

In addition, the filtered fluid is circulated by a pump 10 through a conduit 11 to pass through an ion-exchange column 12 provided as regenerating means into the clean-fluid tank 8. The pump 10 is periodically driven by a motor 13 to intermittently pass the fluid in the tank 8 through the ion-exchange column 12 back into the clean-fluid tank 8. The motor 13 is thus periodically energized by a time unit 14 which is designed to establish a time interval T1 in which the pump 10 is to be deactuated and a time duration T2 in which the pump 10 is to be actuated in each periodic cycle of the fluid regenerating operation. The time interval T1 and time duration T2 are thus made adjustable as desired in the timer unit 14. For example, the time interval T1 is preset for 10 minutes and the time duration T2 is preset for 5 minutes in a standard traveling-wire EDM operation. Thus, the filtered fluid is intermittently diluted with deionized fluid from the ion-exchange column 12 in the clean-fluid tank 8 while the diluted fluid is being delivered into the electroerosion zone 1 via the supply conduit 2. A resistivity (conductivity) sensing cell 15 is provided in the supply conduit 2 to continuously monitor the specific resistance (conductance) of the fluid flowing from the clean-fluid tank 8 towards the EDM zone. The function of the resistivity cell 15 and associated sensing circuit 16 is here to maintain the described periodic operation of the pump 10 and hence the regenerator 12 with a predetermined T2 to T1 ratio (e.g. 5 minutes/10 minutes=0.5) as long as the sensed specific resistance lies below a predetermined level (e.g. $10^5$ ohm-cm for a steel workpiece and $10^6$ ohm-cm for a tungsten carbide workpiece) and to modify the T2/T1 ratio to a reduced value (e.g. 3 seconds/10 minutes=0.005) so as to loosen the regenerating operation when the resistivity rises above that predetermined level. Thus, the resistivity sensing circuit 16 and the timer unit 14 are connected and arranged so as to establish such two different periodic modes of operation for the pump 10 depending on the specific resistance of the fluid being regenerated.

Figure 2:
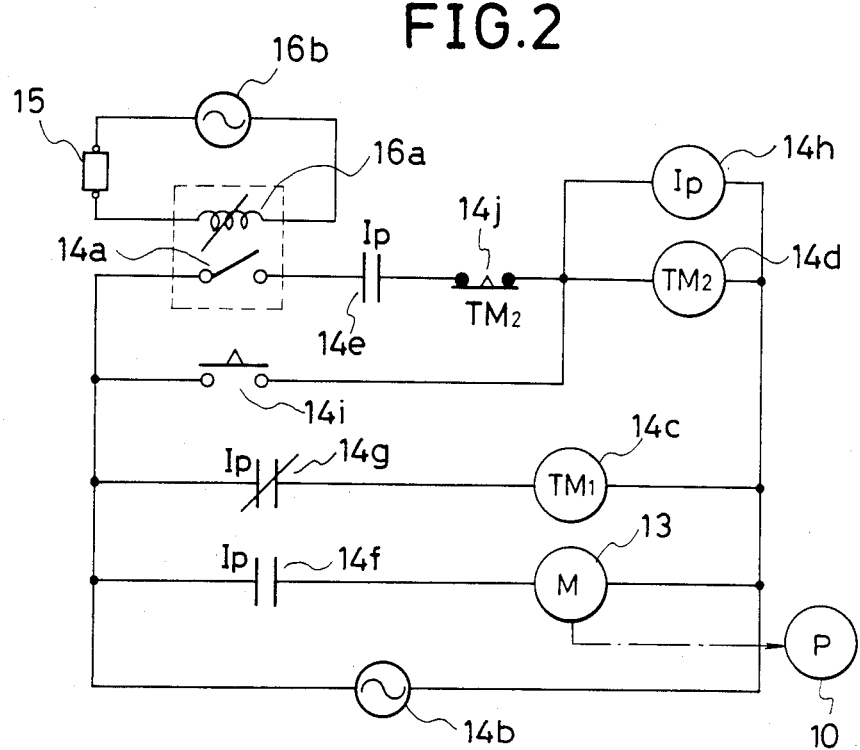
FIG. 2 is a circuit diagram of the timer unit for executing the controlled periodic operation of a pump for the flushing fluid regeneration unit in the system of FIG. 1.

FIG. 2 shows an embodiment of the timer unit 14 and the sensing circuit 16. In this embodiment, a relay coil 16a is connected in series with the resistivity cell 15 and a power supply 16b therefor and is associated with a contact 14a in the timer circuit 14 which includes a power supply 14b, the motor 13 for the pump 10, a first timer 14c (TM1) for establishing the time interval T1, and a second timer 14d (TM2) for establishing the time duration T2 as well as normally open contacts 14e (Ip) and 14f (Ip) and a normally closed contact 14g (Ip) and an energizing coil 14h (Ip) therefor. The contacts 14e and 14f are closed and the contact 14g is open when the coil 14h is energized. Further contacts 14i (TM1) and 14j (TM2) are also provided so as to be closed while the timers 14c (TM1) and 14d (TM2) are in timing operation, respectively. As long as the resistivity of the fluid lies below the predetermined level, the relay coil 16a holds the contact 14a in closed position. In this state, it will be seen that the motor 13 is periodically energized with a predetermined off-time T1 and a predetermined on-time T2 and hence with a predetermined T2/T1 ratio.

Figure 3A:
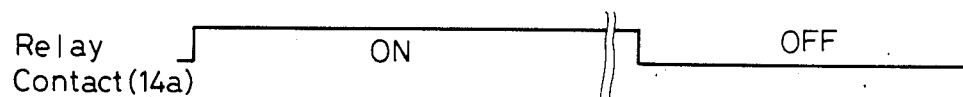
FIG. 3a and 3b are time charts diagrammatically illustrating a relationship between the on/off states of a relay contact and the periodic on/off operation of the pump in the system of FIGS. 1 and 2.
Figure 3B:
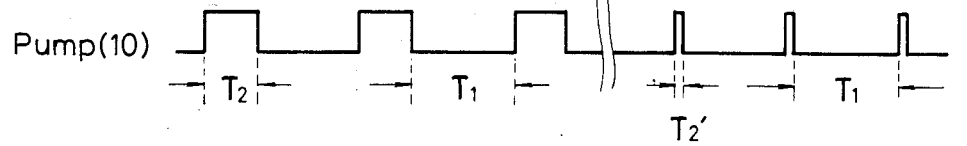

If the resistivity of the fluid lies below the predetermined level, the relay coil 16a holds the contact 14a in open position. In this state, upon lapse of the time interval T1, i.e. when the first timer 14c has just timed out, there is established only for a brief time duration T2' a circuit connecting the coil 14h (Ip) to the power supply 14b to bring the contact 14f into closed position, thus energizing the motor 13 only for that brief time duration. Consequently, the on-time for the pump 13 is reduced to the brief time duration T2' while the off-time T2 remains unchanged in each cycle of the periodic operation as long as the resistivity of the fluid lies below the aforementioned predetermined level. The relationship of the on-off states of the relay contact 14a with the periodic on-off operations of the pump 10 is shown in FIGS. 3a and 3b. In this way, the electrical property of the fluid passing through the EDM is promptly rectified from any possible diviations to a desired level without permitting to expand for control purposes. As a result, the erosive action in the EDM zone is substantially stabilized, thus to check against such deviations in the quality of the recycled fluid.

What is claimed is:

1. An electroerosion machine, comprising:
   means for collecting a flushing liquid medium from an electroerosion zone; and
   fluid treating means for processing the collected liquid medium and then recycling it into said electroerosion zone, the fluid treating means comprising:
   fluid regenerating means for said liquid medium,
   operating means for rendering said regenerating means cyclically active for said medium with a predetermined active to inactive time ratio in each cyclic period,
   sensing means for sensing the resistivity of said liquid medium, and
   means responsive to said sensing means for acting on said operating means to modify said active to inactive time ratio to a reduced value in each cyclic period while said sensed resistivity lies above a predetermined level.

2. The machine defined in claim 1 wherein said regenerating means is an ion-exchange unit.

3. The machine defined in claim 2 wherein said operating means includes a pump for passing the collected liquid medium through said ion-exchange unit prior to recycling into said electroerosion zone.

4. The machine defined in claim 3 wherein said pump has associated therewith timer means for cyclically actuating said pump, said timer means having a first and a second time period preset therein in which said liquid medium is allowed and disallowed to pass through said ion-exchange unit, respectively, in each cyclic period when said resistivity lies below said predetermined level.

5. The machine defined in claim 1 wherein the time ratio modifying means is adapted to shorten said active time while maintaining said inactive time substantially constant in each cyclic period when said sensed resistivity rises above said predetermined level.

6. An electroerosion machine, comprising:
   means for collecting a flushing liquid medium from an electroerosion zone; and
   fluid treating means for processing the collected liquid medium and recycling it into said electroerosion zone, the fluid treating means comprising:
   fluid regenerating means for the liquid medium,
   operating means for rendering said regenerating means cyclically active for said medium with a predetermined active time and inactive time ratio in each cyclic period,
   sensing means for sensing the resistivity of said liquid medium, and
   means responsive to said sensing means for acting on said operating means to change said active to inactive time ratio to a greater value in each cyclic time period when said sensed resistivity falls below a predetermined level.

* * * * *